United States Patent
Liu et al.

(10) Patent No.: US 9,695,994 B2
(45) Date of Patent: Jul. 4, 2017

(54) DIRECT TYPE BACKLIGHT MODULE AND DISPLAY DEVICE

(71) Applicants: BOE Technology Group Co., Ltd., Beijing (CN); Xiamen BOE Electronics Co., Ltd., Xiamen (CN)

(72) Inventors: Shuangfei Liu, Beijing (CN); Jian Zhong, Beijing (CN)

(73) Assignees: BOE TECHNOLOGY GROUP CO., LTD., Beijing (CN); XIAMEN BOE ELECTRONICS CO., LTD., Xiamen (CN)

( * ) Notice: Subject to any disclaimer, the term of this patent is extended or adjusted under 35 U.S.C. 154(b) by 202 days.

(21) Appl. No.: 14/132,778

(22) Filed: Dec. 18, 2013

(65) Prior Publication Data
US 2014/0211452 A1      Jul. 31, 2014

(30) Foreign Application Priority Data

Jan. 28, 2013   (CN) .......................... 2013 1 0031382

(51) Int. Cl.
*G02F 1/1335*    (2006.01)
*F21K 9/60*      (2016.01)
(Continued)

(52) U.S. Cl.
CPC .......... *F21K 9/60* (2016.08); *G02F 1/133603* (2013.01); *H01R 12/7088* (2013.01);
(Continued)

(58) Field of Classification Search
CPC ... G02F 1/133603; G02F 2001/134318; G02F 1/136286; G02F 2001/133612;
(Continued)

(56) References Cited

U.S. PATENT DOCUMENTS

| | | | |
|---|---|---|---|
| 2006/0012989 A1* | 1/2006 | Lee | ............................... 362/231 |
| 2008/0305668 A1 | 12/2008 | Wu | |
| 2009/0310339 A1* | 12/2009 | Jung | ............................ 362/97.3 |

FOREIGN PATENT DOCUMENTS

| | | |
|---|---|---|
| CN | 102042532 A | 5/2011 |
| WO | 2011/148733 A1 | 12/2011 |
| WO | 2012/128074 A1 | 9/2012 |

OTHER PUBLICATIONS

European Patent Office Office Action Appln. No. 14 150 565.1-1904; Dated Dec. 14, 2015.
(Continued)

*Primary Examiner* — Stephen F Husar
(74) *Attorney, Agent, or Firm* — Ladas & Parry LLP

(57) ABSTRACT

The embodiments of present invention disclose a direct type backlight module, comprising a backplate and a plurality of strip lamps provided on the backplate, each of the strip lamps is provided with a lamp set composed of a plurality of light-emitting diodes. The direct type backlight module further comprises a plurality of wires, the lamp set of at least one strip lamp of the plurality of strip lamps is electrically connected to the power supply via the plurality of wires. The lamp set of the at least one strip lamp has two terminals, i.e., positive/negative terminals, the positive/negative terminals of the lamp set of the at least one strip lamp are electrically connected to the corresponding wires via a pair of mated connectors.

18 Claims, 3 Drawing Sheets

(51) Int. Cl.
*H01R 12/70* (2011.01)
*H01R 12/75* (2011.01)
*H01R 13/20* (2006.01)
*H01R 101/00* (2006.01)

(52) U.S. Cl.
CPC .............. *H01R 12/75* (2013.01); *H01R 13/20* (2013.01); *G02F 2001/133612* (2013.01); *G02F 2201/465* (2013.01); *G02F 2201/506* (2013.01); *H01R 2101/00* (2013.01)

(58) Field of Classification Search
CPC ......... G02F 2201/465; G02F 2201/506; G02B 6/0068; G02B 6/0073; G02B 6/0091; G02B 6/009; G02B 6/0011; G02B 6/0083; G09G 3/18; G09G 3/36; F21K 9/50; F21K 9/60; F21S 4/00; F21S 4/008; F21V 21/005; F21V 23/06; F21Y 2101/02; F21Y 2103/003; H01R 12/75; H01R 12/7088; H01R 13/20; H01R 2101/00
USPC .......... 362/612, 606, 97.3, 231, 249.02, 611, 362/97.1, 97.2, 23.1, 23.17, 561, 646, 362/651, 656; 312/223.5; 345/102
See application file for complete search history.

(56) References Cited

OTHER PUBLICATIONS

2nd Office Action issued by the European Patent Office dated Oct. 18, 2016; Appln. 14150565.1-1904/2759870.
First Chinese Office Action dated Jul. 30, 2014; Appln. No. 201310031382.X.
Extended European Search Report dated Sep. 15, 2014; Appln. No. 14150565.1-1904/2759870.
Final European Office Action dated Mar. 28, 2017; Appln. No. 14150565.1-1914.

* cited by examiner

DIRECT TYPE BACKLIGHT MODULE AND DISPLAY DEVICE

TECHNICAL FIELD

The embodiments of present invention relate to a direct type backlight module and a liquid crystal display device comprising a direct type backlight module.

BACKGROUND OF THE DISCLOSURE

A liquid crystal display device comprises a back-light arrangement of a side type or a direct type, wherein the side type backlight module has the advantages of ultra thin and energy-saving while the direct type backlight module has the advantages of relatively outstanding image performance and more uniform luminance.

In the prior art direct type backlight module, the interconnection between each of the strip lamps is achieved through a printed circuit board. Particularly, both ends of a strip lamp are welded to a printed circuit board, so as to achieve a serial or parallel connection between the strip lamps and a connection to a power supply.

However, such connection requires each strip lamp to be welded to the circuit board to achieve electrical connection therebetween, which is relatively complicated and inconvenient for replacing a single strip lamp.

SUMMARY

The embodiment of present invention provides a direct type backlight module that facilitates an easier mounting and allows a single strip lamp to be replaced individually.

The present invention also provides a display device having higher production efficiency.

The first aspect of the present invention provides a direct type backlight module, comprising a backplate and a plurality of strip lamps provided on the backplate, each of the plurality of strip lamps being provided with a lamp set composed of a plurality of LEDs, wherein the direct type backlight module further comprises a plurality of wires, and the lamp set of at least one strip lamp of the plurality of strip lamps is electrically connected to the power supply via the plurality of wires;

the lamp set of the at least one strip lamp has two terminals, i.e., positive/negative terminals, the positive/negative terminals of the lamp set of the at least one strip lamp are electrically connected to its corresponding wire via a pair of mated connectors.

The second aspect of the present invention provides a display device comprising a display panel and the above mentioned direct type backlight module.

Alternatively, the pair of mated connectors is a pair of male connector and female connector mated with each other.

Alternatively, the pair of mated connectors is a pair of snap-fitted plug and receptacle.

Alternatively, the lamp set of each of the plurality of strip lamps is connected to the power supply via the plurality of wires; the lamp set of each of the plurality of strip lamps have two terminals, i.e., positive/negative terminals, the positive/negative terminals of the lamp set of each of the plurality of strip lamp is electrically connected with the corresponding wires via a pair of snap-fitted plug and receptacle.

Alternatively, the receptacle in each pair of plug and receptacle is provided with a bayonet; the side of the plug facing the bayonet is provided with an elastic piece, and the elastic piece is provided at one end with a buckling portion for snap-fitting into the bayonet.

Alternatively, the bayonet is provided at the side of the receptacle away from the strip lamp.

Alternatively, in each of the strip lamp, the receptacle corresponding to the positive terminal of the lamp set is provided at one end of the strip lamp, and the receptacle corresponding to the negative terminal of the lamp set is provided at the other end of the strip lamp.

Alternatively, the wires are electrically connected to the power supply through an outlet provided on the backplate.

Alternatively, each of the receptacles is welded to its corresponding strip lamp.

Alternatively, each of the receptacles is removably mounted to its corresponding strip lamp.

Figure 1:
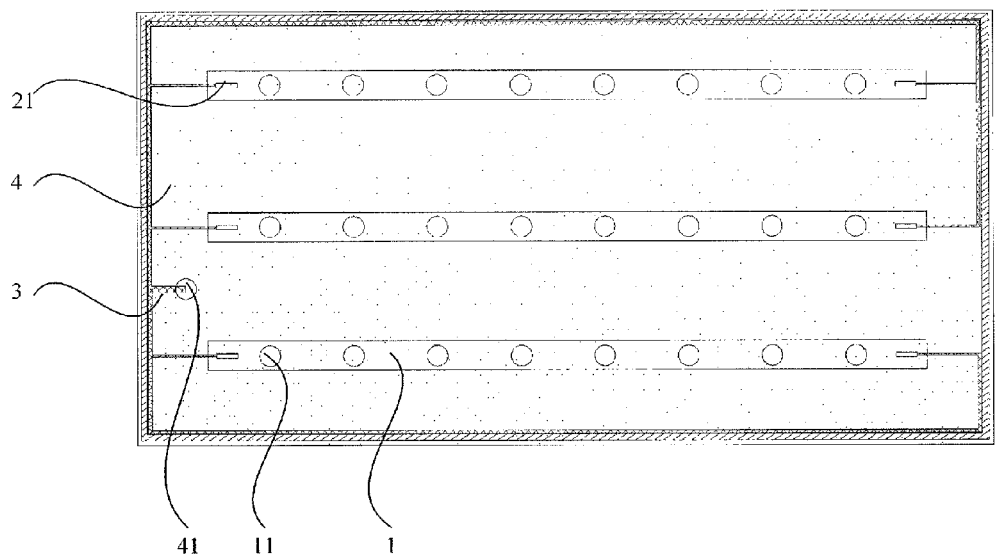
FIG. 1 is a structural schematic view of a direct type backlight module according to the present invention.

1. strip lamp; 11. light-emitting diode; 21. receptacle; 211. bayonet; 22. plug; 221. elastic piece; 222. buckling portion; 23. pressing pin 3. wire; 4. backplate; 41. outlet

DETAILED DESCRIPTION

Detailed description of the embodiment of present invention is provided in the following description, and examples of the embodiments are shown in the drawings. Throughout this disclosure, identical or similar reference numerals refer to identical or similar elements or elements having identical or similar functions. The embodiments described below by reference to the drawings are illustrative, and are only used to illustrate the present invention without limiting.

Unless defined otherwise, the technical terms or scientific terminology used herein should be construed as the meaning usually understood by those skilled in this art of present invention. In the description of the present invention, it should be understood that the orientation or position relationship illustrated by the terminology "center", "longitudinal", "transverse", "upper", "lower", "front", "rear", "left", "right", "vertical", "horizontal", "top", "bottom", "inner", "outer" and the like refer to the orientation or position relationship illustrated based on the drawings, and are used for illustrating the present invention and simplifying the description, rather than teaching or suggesting that the denoted devices or components have to be in specific orientation, and be constructed and operated in specific orientation. Accordingly they are not intended to limitation to the present invention. Furthermore, the terminologies "first" and "second" are used only for the purpose of illustration, and cannot be considered as limitation.

The embodiments of present invention provide a direct type backlight module, as shown in FIG. 1, comprising a backplate 4, and a plurality of strip lamps 1 provided on the backplate 4, each of the strip lamps 1 is provided with a lamp set composed of a plurality of light-emitting diodes 11. The direct type backlight module further comprising:

a plurality of wires 3 via which the lamp sets of the plurality of strip lamps are connected to the power supply.

Figure 2:
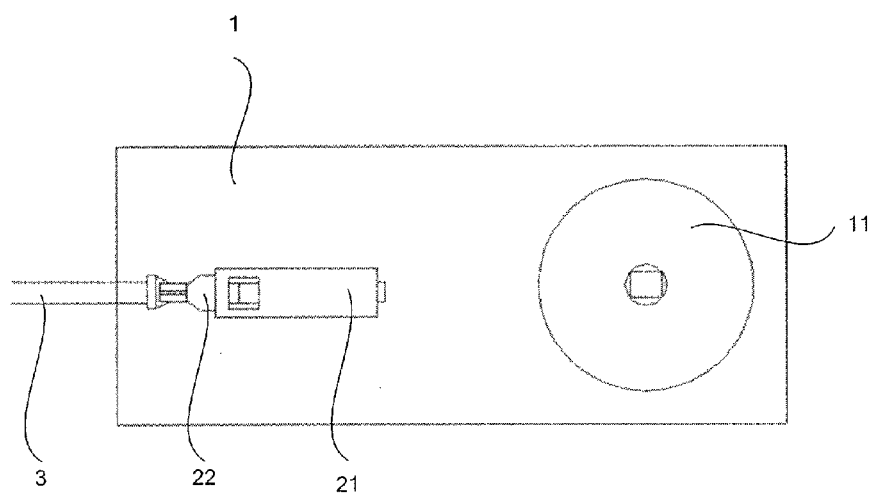
FIG. 2 is a structural schematic view showing the snap-fitted receptacle and plug of the direct type backlight module according to the present invention.

The lamp set of each strip lamp 1 comprises two terminals, i.e., positive/negative terminals, as shown in FIG. 2. The positive terminal of the lamp set is electrically connected to a corresponding wire 3 via a pair of snap-fitted plug 22 and receptacle 21. The negative terminal of the lamp set is electrically connected to a corresponding wire 3 in a similar way as mentioned above.

With the direct type backlight module provided by the embodiment of present invention, when assembling the strip lamps, a serial or parallel connection between each of the plurality of strip lamps 1 can be achieved by using the wires 3 as well as each pair of snap-fitted plug 22 and the receptacle 21.

With the direct type backlight module provided by the embodiment of present invention, when assembling the strip lamps, the situation mentioned in the Background, where the serial or parallel connection between each of the plurality of strip lamps is achieved by directly welding the strip lamps to the printed circuit board, can be eliminated.

Accordingly, the present invention provides a direct type backlight module that facilitates an easier mounting and individual replacement of a single strip lamp.

In the aforesaid preferred embodiments, the positive/negative terminals of the lamp set are electrically connected to corresponding wires 3 via a pair of snap-fitted plug 22 and receptacle 21. However, the present invention is not limited thereto. In alternate embodiments, the positive/negative terminals of the lamp set may be electrically connected to the corresponding wires 3 via a pair of male connector and female connector removably mated with each other. In other alternate embodiments, the positive/negative terminals of the lamp set may be electrically connected to the corresponding wires 3 by a pair of any suitable connectors removably mated with each other.

In some optional embodiments, the lamp set of at least one strip lamp 1 of the plurality of strip lamps 1 is electrically connected to the power supply via the plurality of wires, and the lamp set of the at least one strip lamp 1 has two terminals, i.e., the positive/negative terminals, the positive/negative terminals of the lamp set of the at least one strip lamp 1 are electrically connected to the corresponding wires in the above mentioned manner.

In other optional embodiments, the lamp sets of all the strip lamps 1 are electrically connected to the power supply via the plurality of wires, and each of the lamp sets of all the strip lamp 1 has two terminals, i.e., positive/negative terminals, all the positive/negative terminals of the lamp set of all the strip lamps 1 are electrically connected to corresponding wires in the above mentioned manner.

Figure 3:
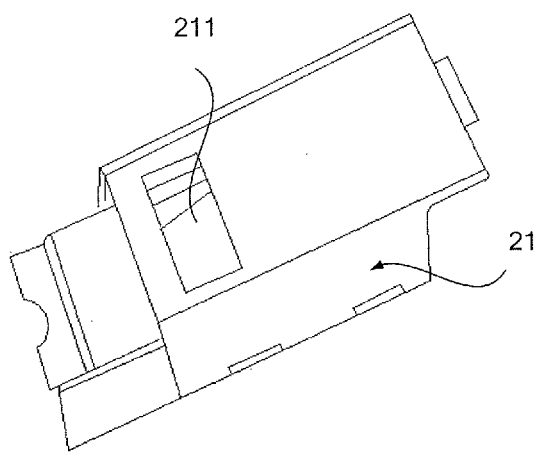
FIG. 3 is a structural schematic view of the receptacle according to the present invention.
Figure 4:
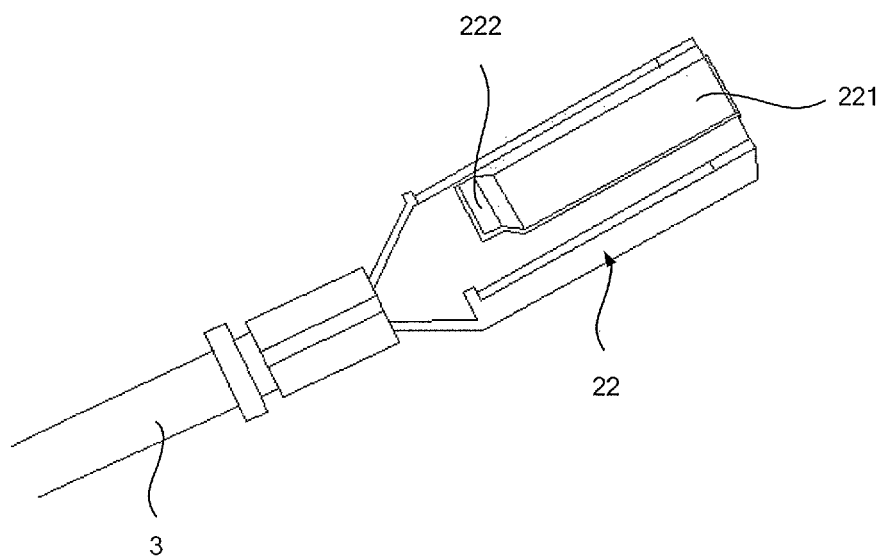
FIG. 4 is a structural schematic view of the plug according to the present invention.

In alternate embodiments, as shown in FIG. 3, the receptacle 21 of each pair of the aforesaid plug 22 and the receptacle 21 is provided with a bayonet 211. As shown in FIG. 4, the side of the plug 22 facing the bayonet 211 is provided with an elastic piece 221, with one end of the elastic piece 221 being provided with a buckling portion 222 for snap-fitting into the bayonet 211. During the process of inserting the plug 22 into the receptacle 21, the elastic piece 221 on the plug 21 will be compressively deformed toward the side away from the bayonet 211, and the elastic piece 221 rebounds when the buckling portion 222 is located below the bayonet 211, such that the buckling portion 222 is snap-fitted into the bayonet 211. Such a configuration achieves the snap-fit between the plug 22 and the receptacle 21.

To facilitate the inserting of the plug 22 into the receptacle 21, the above mentioned bayonet 211 is preferably arranged at the side of the receptacle 21 away from the strip lamp 1.

To facilitate the serial or parallel connection between the strip lamps 1, preferably in each strip lamp 1, the receptacle 21 corresponding to the positive terminal of the lamp set is provided at one end of the strip lamp 1, and the receptacle 21 corresponding to the negative terminal of the lamp set is provided at the other end of the strip lamp 1, as shown in FIG. 1.

As shown in FIG. 1, the backplate 4 is further provided with an outlet 41, through which the wire 3 is electrically connected to the power supply. The wire 3 connecting each strip lamp 1 in a serial or parallel manner electrically connects to the power supply through the outlet 41.

Each receptacle 21 can be secured onto each strip lamp 1 in various manners:

Manner 1

Each of the receptacles 21 is welded onto a corresponding strip lamp 1. Welding of the receptacle 21 can prevent the occurrence of a poor contact. When replacing the strip lamp 1, first removing the corresponding plug 22 from the receptacle 21, then replacing the used strip lamp 1 welded with a receptacle 21 with a new strip lamp 1 welded with a receptacle 21, and finally snap-fitting the corresponding plug 22 into the receptacle 21 of the new strip lamp 1.

Manner 2

Each receptacle 21 is removably mounted to a corresponding strip lamp 1. The receptacle 21 can be mounted to its corresponding strip lamp 1 by a snap-fitting, or other appropriate manners, with the detail description thereof omitted herein. The removable receptacle 21 allows the strip lamp 1 which does not work properly to be replaced individually, and thus the cost can be reduced.

Figure 5:
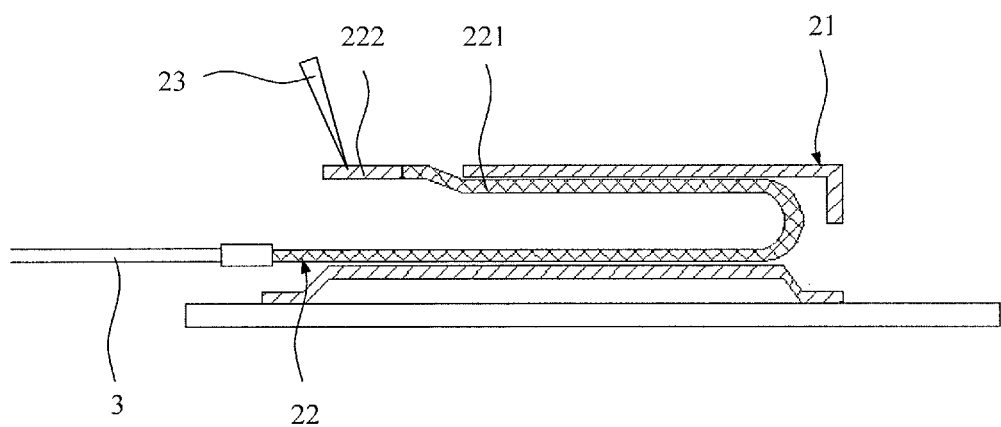
FIG. 5 is a section view of the snap-fitted receptacle and plug according to the present invention.

As shown in FIG. 5, to facilitate the removal of the plug 22 from the receptacle 21, the present invention is also provided with a pressing pin 23 for pressing the buckling portion 222. When it is desired to remove the plug 22 from the receptacle 21, the pressing pin 23 may press down the buckling portion 222 of the plug 22, and then the elastic piece 221 will compressively deform toward the side away from the bayonet 211, thereby the buckling portion 222 is moved out of the bayonet 211 so as to facilitate the removal of the plug 22 from the receptacle 21.

In the above mentioned manners, the plug 22 and the receptacle 21 can be made from plastics, or metal materials, as well as other appropriate materials; the detailed description is omitted here.

The embodiment of present invention provides a display device comprising a display panel and the above mentioned direct type backlight module.

In the display device comprising the above mentioned direct type backlight module according to the embodiment of present invention, during the assemble process, a serial or parallel connection between the strip lamps 1 can be achieved by means of snap-fitting between the plug 22 and the receptacle 21 when mounting the strip lamp 1, thereby manpower and man-hour can be reduced. Accordingly, the present invention provides a display device with higher production efficiency.

The above descriptions are only exemplary embodiments for illustrating the principle of the present invention, and are not intended to limit the protective scope of the present invention. Obviously, various alternations and modifications can be made by those skilled in this art, without departing from the spirit and essence of the present invention. Such alternations and modifications are also within the protective scope of this invention.

What is claimed is:

1. A direct type backlight module, comprising a backplate and a plurality of strip lamps provided on the backplate, each of the plurality of strip lamps being provided with a lamp set composed of a plurality of LEDs,
    wherein the direct type backlight module further comprises a plurality of wires, and the lamp set of at least one strip lamp of the plurality of strip lamps is electrically connected to the power supply via the plurality of wires;
    the lamp set of the at least one strip lamp has two terminals, i.e., positive/negative terminals, the positive/negative terminals of the lamp set of the at least one strip lamp are electrically connected to its corresponding wire via a pair of mated connectors; and
    wherein the pair of mated connectors is a pair of snap-fitted plug and receptacle, and the receptacle in each pair of plug and receptacle is provided with a bayonet; the side of the plug facing the bayonet is provided with an elastic piece, and the elastic piece is provided at one end with a buckling portion for snap-fitting into the bayonet.

2. The direct type backlight module according to claim 1, wherein the pair of mated connectors is a pair of male connector and female connector removably mated with each other.

3. The direct type backlight module according to claim 1, wherein the lamp set of each of the plurality of strip lamps is connected to the power supply via the plurality of wires; the lamp set of each of the plurality of strip lamps have two terminals, i.e., positive/negative terminals, the positive/negative terminals of the lamp set of each of the plurality of strip lamp is electrically connected with the corresponding wires via a pair of snap-fitted plug and receptacle.

4. The direct type backlight module according to claim 1, wherein the bayonet is provided at the side of the receptacle away from the strip lamp.

5. The direct type backlight module according to claim 3, wherein in each of the strip lamp, the receptacle corresponding to the positive terminal of the lamp set is provided at one end of the strip lamp, and the receptacle corresponding to the negative terminal of the lamp set is provided at the other end of the strip lamp.

6. The direct type backlight module according to claim 1, wherein the wires are electrically connected to the power supply through an outlet provided on the backplate.

7. The direct type backlight module according to claim 3, wherein each of the receptacles is welded to its corresponding strip lamp.

8. The direct type backlight module according to claim 3, wherein each of the receptacles is removably mounted to its corresponding strip lamp.

9. A display device comprising a display panel, wherein the display device further comprises the direct type backlight module according to claim 1.

10. The display device according to claim 9, wherein the pair of mated connectors is a pair of male connector and female connector mated with each other.

11. The display device according to claim 9, wherein the pair of mated connectors is a pair of snap-fitted plug and receptacle.

12. The display device according to claim 9, wherein the lamp set of each of the plurality of strip lamps is connected to the power supply via the plurality of wires; the lamp set of each of the plurality of strip lamps have two terminals, i.e., positive/negative terminals, the positive/negative terminals of the lamp set of each of the plurality of strip lamp is electrically connected with the corresponding wires via a pair of snap-fitted plug and receptacle.

13. The display device according to claim 11, wherein the receptacle in each pair of plug and receptacle is provided with a bayonet; the side of the plug facing the bayonet is provided with an elastic piece, and the elastic piece is provided at one end with a buckling portion for snap-fitting into the bayonet.

14. The display device according to claim 13, wherein the bayonet is provided at the side of the receptacle away from the strip lamp.

15. The display device according to claim 12, wherein in each of the strip lamp, the receptacle corresponding to the positive terminal of the lamp set is provided at one end of the strip lamp, and the receptacle corresponding to the negative terminal of the lamp set is provided at the other end of the strip lamp.

16. The display device according to claim 9, wherein the wires are electrically connected to the power supply through an outlet provided on the backplate.

17. The display device according to claim 12, wherein each of the receptacles is welded to its corresponding strip lamp.

18. The direct type backlight module according to claim 12, wherein each of the receptacles is removably mounted to its corresponding strip lamp.

* * * * *